United States Patent [19]
Watson

[11] 3,927,110
[45] Dec. 16, 1975

[54] THERMOLYSIS OF STYRENE OXIDE
[75] Inventor: James M. Watson, Big Spring, Tex.
[73] Assignee: Cosden Oil & Chemical Company, Big Spring, Tex.
[22] Filed: Jan. 18, 1974
[21] Appl. No.: 434,675

[52] U.S. Cl. .............................................. 260/599
[51] Int. Cl.² ............................................. C07C 45/22
[58] Field of Search ................................... 260/599

[56] References Cited
UNITED STATES PATENTS
| | | | |
|---|---|---|---|
| 2,628,255 | 2/1953 | Sexton et al. | 260/599 |
| 3,067,256 | 12/1962 | Fischer et al. | 260/599 X |
| 3,122,588 | 2/1964 | Phillips et al. | 260/599 X |

Primary Examiner—Bernard Helfin

[57] ABSTRACT

Styrene oxide is heated under relatively mild temperature conditions to cause thermolysis. Such thermolysis produces substantial quantities of phenylacetaldehyde in the reaction product. The heating of the styrene oxide is accomplished in the presence of a small quantity of an alkaline earth metal sulfonate. Very small quantities of the alkaline earth metal sulfonate alleviate inhibitive tendencies of the reaction from styrene oxide to phenylacetaldehyde, while somewhat larger quantities markedly promote the reaction. Magnesium sulfonate and calcium sulfonate are preferred. Commercially pure phenylacetaldehyde is recovered from the reaction product.

19 Claims, No Drawings

THERMOLYSIS OF STYRENE OXIDE

This invention relates to thermolysis of styrene oxide in the presence of a small quantity of alkaline earth metal sulfonate, which serves to prevent inhibition, and in slightly larger quantities, to promote reaction of the styrene oxide to phenylacetaldehyde.

Styrene oxide is a well known raw material utilized for the production of various chemicals. Likewise, phenylacetaldehyde is a well known chemical compound with a variety of uses. For example, phenylacetaldehyde, as well as dimethylacetal and ethylene glycol acetals thereof, is used in perfume manufacture and formulation. Such utilization is well known to those skilled in the art and will not be further described.

As described in detail in my prior application, Ser. No. 335,456 filed Feb. 26, 1973, styrene oxide may be heated under relatively mild temperature conditions to cause thermolysis. Such thermolysis produced substantial quantities of phenylacetaldehyde in the reaction product. Substantially pure phenylacetaldehyde may be recovered from the crude reaction product by distillation procedure, or other separation means, or, if desired, the phenylacetaldehyde may be directly converted in the crude reaction product to produce its acetals. The process of thermolysis of styrene oxide may be conducted with the styrene oxide in liquid phase, in vapor phase, or in solution within an inert solvent. The conditions of reaction are maintained to achieve a mild decomposition, perhaps best described as a rearrangement or thermolysis, as contrasted to a drastic decomposition, or so-called pyrolysis. In accordance with this prior invention, it was found that styrene oxide rearranges under a relatively mild set of conditions, to produce a radically different, but yet desirable, reaction. The reaction may be conducted either batch-wise, or as a flow process.

In accordance with the invention described in the prior application, Ser. No. 335,456 filed Feb. 26, 1973, it is possible, if desired, to obtain an acetal directly instead of phenylacetaldehyde. This may be accomplished without isolating the aldehyde by treating the crude reaction material appropriately. Thus, by the addition of ethylene glycol, with an acid catalyst, for example, $H_2SO_4$, p-toluene sulfonic acid, benzene sulfonic acid, phosphoric acid, etc., conversion of the phenylacetaldehyde to phenylacetaldehyde ethylene glycol acetal may be achieved. Alternatively, with methanol as an additive to the crude reaction mixture in the presence of such an acid catalyst, the diamethylacetal of phenylacetaldehyde may be obtained.

In the practice of thermolysis of styrene oxide, I have learned that in many instances the reaction becomes inhibited after it has been run in a particular vessel or system for some period of time, often after the passage of a relatively short period of time. Various efforts were made to overcome the inhibiting effect noted, and finally it was observed that the presence of a very small quantity of alkaline earth metal sulfonate, for example, calcium sulfonate or magnesium sulfonate, stopped or alleviated this tendency toward inhibition. Initially, it was found that merely flushing the vessel or passivating the vessel with the alkaline earth metal sulfonate reversed the tendency toward inhibition, at least long enough to permit the further activation of the reaction in the vessel to produce satisfactory reaction for some period of time.

It was further observed that the addition of a very small quantity of calcium sulfonate, magnesium sulfonate, or other alkaline earth metal sulfonate to the reaction charge prevented the inhibition effect. Moreover, it was observed that with somewhat larger quantities of the sulfonate, still small as a relative matter compared to the amount of reactant, the reaction was materially promoted.

In a preferred embodiment of the invention, a quantity of alkaline earth metal sulfonate, preferably magnesium sulfonate or calcium sulfonate, is added to styrene oxide in an inert liquid, for example benzene, toluene, zylene, 2, 2, 4-trimethylpentane or the like. In this embodiment, the temperature is preferably held at between about 125°C and 450°C, with from about 175°C to about 350°C being particularly preferred. Best results to date have been achieved at temperatures within the specifically preferred range of between about 225°C and 325°c when the reaction is run in liquid phase with styrene oxide carried by an inert solvent.

Turning to the description of the present invention in more detail, styrene oxide may be heated either batchwise or in a continuous flow process to cause thermolysis. While substantially pure styrene oxide may be so reacted, it is often preferable that the styrene oxide be dissolved in an inert organic solvent such as toluene, benzene, xylene, ethyl benzene, heptane, octane and other analogous hydrocarbons and other inert solvents to accomplish the thermolysis step. In the case of a solution type of reaction, wherein the styrene oxide is dissolved in an inert solvent, a relatively minor amount of styrene oxide is preferably dissolved within a relatively major amount of inert solvent. In this system, in turn a small proportion of alkaline earth metal sulfonate is utilized.

Minor amount is defined hereby as less than about 0.5 weight fraction of the total mixture or sample while major amount is defined as more than about 0.5 weight fraction of the total mixture or sample. Small proportion is defined as less than about 0.05 weight fraction based on the total quantity of styrene oxide initially present, and includes any perceptible amount of the alkaline earth sulfonate material involved in the present invention since it has been noted that alkaline earth metal sulfonates are effective to at least some extent when present in only trace quantities, and even when the vessels have been merely subject to a prewash or preliminary pretreatment by the sulfonate. It is preferred that the alkaline earth metal sulfonate be present in weight fraction of from about 0.001 to about 0.01 (based on the quantity of styrene oxide present in the initial charge).

When thermolysis of styrene oxide is conducted in accordance with the solution aspect of the present invention, preferably the styrene oxide is present in a quantity of about 2–20% expressed as a percentage of styrene oxide by weight in the total solution of the styrene oxide and inert solvent and the reaction temperature is preferably maintained between about 175°C and 350°C. In such system, the alkaline earth metal sulfonate is present in minor proportions, preferably between about 0.1% and 1.0% expressed as a weight percent of the total quantity of styrene oxide in the initial charge.

When thermolysis of styrene oxide is conducted in solution, the reaction product is subjected to a process step to separate the phenylacetaldehyde produced in the crude reaction product. Details of such separation are contained in the prior application Ser. No. 335,456 filed Feb. 26, 1973, and such details will not be repeated further herein. Moreover, such prior application contains details concerning vapor, liquid and solution phase practice of the thermolysis of styrene oxide under a variety of conditions and reference may be had to that application for those details. Suffice to say that the present invention involves the utilization of an alkaline earth metal sulfonate in the thermolysis of styrene oxide and that such sulfonate may be utilized under the range of operating conditions and in the various modes of practice described in such prior application. Accordingly, attention will now be focused on practice utilizing the improvement of the addition of a small quantity of alkaline earth metal sulfonate, but with the understanding that such sulfonate may be utilized under the broad range of examples of the prior application. Illustrative examples will be given, however, at an appropriate point hereinafter.

The alkaline earth metal sulfonate involved in the present invention is described as a "promoter" whether a small quantity is used to avoid inhibiting effects in the reaction (as by passivating a reaction vessel to reactivate it), or whether a larger quantity is used to achieve a marked noticeable promoting or enhancing effect on the reaction. It will be appreciated that either way a gain or promotion of the reaction is in effect obtained, whether by way of militating against inhibition, or by way of a noticeably more rapid or complete reaction.

Some of the compounds which can be used as promoters within the scope of this invention include alkyl aryl sulfonates and aryl sulfonates of the metals of Group IIA of the Periodic Table as set forth on page B2 of the *Handbook of Chemistry and Physics*, Chemical Rubber Company, 45th ed. (1964). When the alkyl aryl sulfonates are utilized, generally, straight or branched chain mono or dialkyl aryl sulfonates can be used in the scope of this invention wherein each alkyl chain contains less than about 50 carbon atoms, and preferably from about 15 to about 20 carbon atoms. The aryl nucleus of the molecule can be benzene, naphthalene, anthracene, and the like. Preferably, the compounds are slightly basic (or near neutral). A Base Number for the compounds of about 2 to 300 is preferred, and best results to date have been achieved with Base Numbers ranging between about 5 and 30.

The most preferred materials which are used in the scope of this invention include the alkaline earth metal mono and dialkyl benzene sulfonates wherein each alkyl chain contains from about 15 to about 20 carbon atoms, and the normal materials available and effectively usable contain mixtures of such compounds with molecules predominately ranging from 15 to 20 carbon atoms in the mixture.

While it appears that the metals of Group IIA of the Periodic Table, i.e., the alkaline earth metals, generally have utility in connection with the present invention, the magnesium alkyl aryl sulfonates and aryl sulfonates are presently preferred, with the analogous compounds of calcium being a second preference. When the barium compounds are utilized, some activity results; however, the nature of such is much lower than for the magnesium and calcium compounds and barium is presently considered to act as a promoter by functioning as a passivating agent for the reaction vessel rather than by any separate catalytic mechanism in the reaction.

An example of a commercially available compound mixture of such class and nature which has been particularly effective is the compound known as Bryton Calcium Sulfonate 45, produced by Bryton Chemical Company. This substance has a specific gravity at 60°F of 0.95, a flash point of 370°F, and a viscosity at 210°F (SUS) of 180. It has a Base Number of 22. It is 3.0% by weight sulphur.

Another commercially available compound, through the same manufacturer, that has been found quite effective is Bryton magnesium sulfonate M-10. This substance has a specific gravity at 60°F. of 0.92, and a flash point of 370°F. It has a Base Number on the order of 10.

The following specific examples of the practice of the present invention are offered for the purpose of illustration only and are not to be taken as limiting the scope of the invention.

EXAMPLE 1

A stainless steel Parr stirred reactor is charged with 70 grams of styrene oxide and 700 grams of benzene in which 0.7 grams (1% by weight, referred to the quantity of styrene oxide present) of calcium sulfonate as described previously herein has been dissolved. The specific calcium sulfonate utilized was that commercially available as Bryton calcium sulfonate 45. The reactor is sealed and heated at 275°, plus or minus 5 degrees for 1 hour, with conventional stirring. Analysis of the product gives the following results:

| Reaction Time | % By Weight Styrene Oxide | % By Weight Phenylacetaldehyde |
|---|---|---|
| 1 hr. | 0.3 | 8.3 |

For comparison, reference is made to data used performing this same experiment in a system which has been run for 30 runs on a batch basis, but without the presence of any of the sulfonate. Results there are as follows:

| Reaction Time | % By Weight Styrene Oxide | % By Weight Phenylacetaldehyde |
|---|---|---|
| 1 hr. | 8.4 | 0.2 |

In the foregoing it will be noted that an inhibited condition prevailed in this system. This same system when drained and run as in the initial experiment of this Example 1, described above, yields the same vastly improved results given therein.

It should be noted that the presence of the sulfonate in the reacting mixture not only prevents inhibition but accelerates the reaction relative to what is usually thought to be the true thermal rate.

EXAMPLE 2

The calcium sulfonate promoted reaction of Example 1 is repeated except that the quantity of calcium sulfonate is decreased to 0.2 grams (0.29 weight percent relative to the quantity of styrene oxide present). The thermolysis was run as before in Example 1 and samples were taken for gas liquid chromatographic analysis at 1 hour, 2 hours and 2 ½ hours, as well as for a starting sample. The results are as follows:

| Reaction Time | % By Weight Styrene Oxide | % By Weight Phenylacetaldehyde |
| --- | --- | --- |
| 0 | 11.1 | 2.6 |
| 1 | 2.5 | 6.3 |
| 2 | 0.1 | 6.9 |
| 2½ | — | 6.4 |

Purity of the phenylacetaldehyde, on a benzene excluded basis, with respect to the samples in this example was 61.7% at 1 hour, 71.9% at 2 hours, and 68.8% at 2½ hours.

EXAMPLE 3

A two liter stainless steel Parr reactor is rigged with a gravity inlet, a bottom drain and a cooling coil to permit sequential runs without opening and closing the reactor lid. The reactor is filled with a thousand milliliters of benzene and with fifteen grams of calcium sulfonate (Bryton calcium sulfonate 45). This mixture is heated to 200°C while stirring for the purpose of passivating. Thereafter, the heating is ceased and the mixture is allowed to remain in the reactor for 2 days. The reactor is then drained, and rinsed once with 400 mls. of benzene while stirring. Thereafter, the reactor is charged with 0.2 grams of calcium sulfonate, 70 grams of styrene oxide and 700 grams of benzene. The reactor is sealed and stirred. The reactor is heated to maintain a reaction temperature of 275°C plus or minus 5°. Gas liquid chromatographic samples are taken and analyzed to provide the following results, with all quantities being given on a weight percent basis relative to the total sample:

| Reaction Time (hours) | Styrene Oxide | Phenyl Acetaldehyde | "Heavys" | "Lights" | "Benzene" |
| --- | --- | --- | --- | --- | --- |
| 1 | 3.5 | 5.4 | 2.5 | 0.3 | 88.3 |
| 2 | 0.6 | 6.8 | 1.8 | 0.3 | 90.3 |

The reactor is then cooled to 25°C over a period of 8 minutes following the taking of the last sample and emptied. The final mixture is sampled to yield the following results, with all quantities being given on a weight percent basis relative to the total sample:

| Styrene Oxide | Phenylacetaldehyde | "Heavys" | "Lights" | "Benzene" |
| --- | --- | --- | --- | --- |
| 0.1 | 4.7 | 1.0 | 0.2 | 94.1 |

EXAMPLE 4

Example 3 is repeated except that the amount of calcium sulfonate is decreased to 0.1 grams. The results are as follows, with all quantities being given on a weight percent basis relative to the total sample:

| Reaction Time (hours) | Styrene Oxide | Phenyl Acetaldehyde | "Heavys" | "Lights" | "Benzene" |
| --- | --- | --- | --- | --- | --- |
| 1 | 4.3 | 7.2 | 0.8 | 0.3 | 87.5 |
| 2 | 1.9 | 7.6 | 1.3 | 0.4 | 88.8 |
| 2=½ | 1.1 | 8.6 | 1.1 | 0.2 | 89.0 |

As in the previous sample, the reactor is cooled to 25°C. and the final mixture analyzed to yield the following results, with all quantities being given on a weight percent basis relative to the total sample:

| Styrene Oxide | Phenylacetaldehyde | "Heavys" | "Lights" | "Benzene" |
| --- | --- | --- | --- | --- |
| 0.8 | 6.7 | 0.4 | 0.2 | 92.0 |

It is noted that the product mixture is much lighter in color than the product from example 3.

EXAMPLE 5

A two liter Parr stirred steel reactor is charged with 70 grams of styrene oxide, 0.1 grams of calcium sulfonate (Bryton 45), and 700 grams of benzene. The reactor is sealed and stirring is commenced while heating to provide a reaction temperature of 290°C. It was noted that the pressure under these conditions was approximately 720 psig. Periodic samples were withdrawn for gas liquid chromatographic analysis and the results obtained from such analysis were as follows, with all quantities being given on a weight percent basis relative to the total sample:

| Reaction Time (hours) | Styrene Oxide | Phenyl Acetaldehyde | "Heavys" | "Lights" | "Benzene" |
| --- | --- | --- | --- | --- | --- |
| .25 | 5.2 | 6.2 | 0.6 | 0.2 | 88.0 |
| .75 | 2.4 | 7.3 | 1.3 | 0.2 | 88.7 |
| 1.50 | 0.9 | 9.9 | 1.1 | Trace | 87.9 |
| 2.00 | 0.1 | 11.6 | 0.6 | 0.4 | 87.3 |
| 2.25 | — | 9.9 | 1.2 | 0.4 | 88.5 |

The reaction mixture is cooled to 25°C. using a cooling coil after the last sample is taken. Visual observation indicates a relatively light, clean reaction mixture. This observation would appear to be in agreement with the rather small amount of heavy by-product present.

It should be noted that in this example the quantity of calcium sulfonate utilized was approximately 0.15 weight percent, relative to styrene oxide as a basis.

SAMPLE 6

The preceding example is repeated except the temperature is 300°C. instead of 290°C. The pressure at this temperature was in the range of 800–840 psig. Gas liquid chromatographic analysis yields the following results, with all quantities being given on a weight percent basis relative to the total sample:

EXAMPLE 7

A two liter Parr stirred steel reactor (316 stainless steel, containing C steel coupon) is charged with 50 grams of styrene oxide, 500 grams of benzene and 0.1 grams of magnesium sulfonate (specifically, commercially available Bryton M-10 magnesium sulfonate). The reactor is sealed and stirring is accomplished while heating to provide a reaction temperature of 200°C., plus or minus 5°. The pressure at this reaction temperature is approximately 200 psig.

Gas liquid chromatographic analysis samples were taken at the times indicated in the tables below, with the following results, with all quantities being given on a weight percent basis relative to the total sample:

| Reaction Time (hours) | Styrene Oxide | Phenyl Acetaldehyde | "Heavys" | "Lights" | "Benzene" |
|---|---|---|---|---|---|
| 0.5 | 3.7 | 7.3 | 3.6 | 0.4 | 84.9 |
| 1.0 | 1.0 | 12.1 | 1.9 | 0.1 | 85.0 |
| 1.5 | — | 10.3 | 1.9 | 0.1 | 87.7 |
| 2.0 | — | 10.9 | 1.8 | 1.2 | 86.3 |

It may be noted that on a basis excluding the presence of benzene that the last sample analyzed just above contained 86.2 percent phenylacetaldehyde, with only 1.5 percent "heavys" and no measurable "lights."

The thermolysis, i.e., rearrangement of the styrene oxide to phenylacetaldehyde, is quite smooth in this present example and a clean product is produced, although the reaction may be rather slow for some commercial purposes. Nevertheless, the rate in this situation is still substantially more rapid than an uncatalyzed (i.e. thermal) rate obtained prior to the onset of inhibition at 200°C in a Parr reactor vessel, under the same conditions as described herein, without the presence of the magnesium sulfonate promoter.

EXAMPLE 8

The preceding run is repeated except that a temperature of 225°C is used instead of 200°C. The pressure in the vessel is observed to be 280 psig. The results are as follows, with all quantities being given on a weight percent basis relative to the total sample:

| Reaction Time (hours) | Styrene Oxide | Phenyl Acetaldehyde | "Heavys" | "Lights" | "Benzene" |
|---|---|---|---|---|---|
| 0.33 | 3.2 | 5.4 | 0.4 | 0.2 | 90.6 |
| 0.83 | 1.2 | 5.7 | 0.7 | — | 92.5 |
| 1.17 | 0.5 | 5.9 | 0.4 | — | 93.1 |
| 1.50 | — | 5.3 | 0.6 | — | 94.2 |
| 2.00 | — | 6.8 | 0.3 | — | 92.9 |
| 3.00 | — | 6.4 | 0.2 | — | 93.4 |

It is concluded from the above, as well as from inspection, that the rearrangement is clean and completed in about 1.5 hours at 225°C. It will be noted that at that point styrene oxide had disappeared from the analytical results and that the percentage of phenylacetaldehyde was high. Thus, computed on a basis excluding benzene, the phenylacetaldehyde percentage at 1.5 hours was 89.8. A three hours, the phenylacetaldehyde percentage, on a benzene excluded basis, was 97.0 percent.

EXAMPLE 9

The preceding run is repeated except that a temperature of 250°C. is used. The pressure at this temperature is on the order of 400 psig. The results are as follows, with all quantities being given on a weight percent basis relative to the total sample:

| Reaction Time (hours) | Styrene Oxide | Phenyl Acetaldehyde | "Heavys" | "Lights" | "Benzene" |
|---|---|---|---|---|---|
| 0.17 | 2.8 | 10.4 | 0.3 | 0.3 | 86.2 |
| 0.33 | 1.1 | 9.8 | 0.3 | 0.2 | 88.4 |
| 0.50 | 0.4 | 11.5 | 1.0 | 0.3 | 86.7 |
| 0.67 | — | 11.4 | 1.1 | 0.4 | 87.1 |
| 0.83 | — | 9.1 | 0.2 | 0.3 | 90.5 |
| 1.00 | — | 8.4 | 0.9 | 0.4 | 90.3 |
| 1.25 | — | 8.2 | 1.4 | 0.3 | 90.0 |

It should be noted that in this example the thermolysis or rearrangement was clean and completed at approximately 0.67 hours.

The end product of this example is cooled and is subjected to a vacuum distillation, with the bottoms product being conducted to a second distillation column, wherein fractional distillation is accomplished to attain phenylacetaldehyde of a satisfactory commercial purity.

EXAMPLE 10

The preceding run is repeated except that the temperature is 225°C., with a pressure of 280 psig, and that

| Reaction Time (hours) | Styrene Oxide | Phenyl Acetaldehyde | "Heavys" | "Lights" | "Benzene" |
|---|---|---|---|---|---|
| 0.25 | 3.9 | 2.6 | 1.2 | — | 92.3 |
| 0.75 | 3.7 | 3.2 | 1.5 | — | 91.7 |
| 1.25 | 2.6 | 3.5 | 0.3 | — | 93.6 |
| 2.00 | 4.0 | 5.3 | 0.6 | 0.4 | 89.7 |
| 3.00 | 2.0 | 5.2 | 0.4 | — | 92.4 |
| 4.50 | 0.8 | 5.6 | 0.1 | — | 93.5 | the quantity of magnesium sulfonate is increased to 0.3 grams instead of the 0.1 gram utilized therein. The results obtained are as follows, with all quantities being given on a weight percent basis relative to the total sample:

| Reaction Time (hours) | Styrene Oxide | Phenyl Acetaldehyde | "Heavys" | "Lights" | "Benzene" |
|---|---|---|---|---|---|
| 0.33 | 2.5 | 7.6 | 0.9 | 0.4 | 88.7 |
| 0.83 | 0.4 | 9.3 | 1.0 | 0.2 | 88.9 |
| 1.17 | — | 8.8 | 1.2 | 0.5 | 89.5 |
| 1.50 | — | 9.1 | 1.8 | 0.4 | 88.7 |
| 2.00 | — | 7.6 | 1.6 | 0.4 | 90.4 |
| 3.00 | — | 6.8 | 2.6 | 0.4 | 90.2 |

In the example above it will be noted that the rearrangement was completed in about one hour. Separation of the end product in this particular example, in accordance with the same procedure referred to in preceding Example 9, gives a phenylacetaldehyde end product of acceptable commercial quality.

EXAMPLE 11

A two liter Parr stirred steel reactor is charged with 50 grams of styrene oxide, 500 grams of benzene and one-tenth gram of Bryton M-50 magnesium sulfonate having a Base Number of 31. The reactor is sealed and stirring is accomplished while heating to provide a reaction temperature of 300°C. Gas liquid chromatographic analysis of samples of the reacting product yields the following results, with all quantities being given on a weight percent basis relative to the total sample:

| Reaction Time (hours) | Styrene Oxide | Phenyl Acetaldehyde | "Heavys" | "Lights" | "Benzene" |
|---|---|---|---|---|---|
| 0.33 | — | 4.2 | 0.6 | — | 94.2 |
| 0.67 | — | 4.9 | 5.4 | — | 89.7 |
| 1.00 | — | 5.2 | 7.8 | 0.3 | 86.7 |
| 1.33 | — | 3.2 | 5.3 | 0.3 | 91.2 |

In this example it was noted that rearrangement was completed even prior to the taking of the first sample. On the other hand, there was a rather substantial formation of heavys pursuant to practice under this example. While the heavy analysis appeared somewhat high, the color of the reaction mixture was light.

EXAMPLE 12

Example 11 is repeated except that Bryton M-10 magnesium sulfonate (having a Base Number of 11.6) is substituted for the more basic calcium sulfonate used in Example 11. The gas liquid chromatographic results were as follows, with all quantities being given on a weight percent basis relative to the total sample:

| Reaction Time (hours) | Styrene Oxide | Phenyl Acetaldehyde | "Heavys" | "Lights" | "Benzene" |
|---|---|---|---|---|---|
| 0.33 | — | 10.1 | 0.6 | 0.4 | 88.9 |
| 0.67 | — | 7.1 | 0.9 | 0.4 | 91.6 |
| 1.00 | — | 6.4 | 0.8 | 0.4 | 92.4 |
| 1.33 | — | 5.2 | 1.4 | 0.4 | 92.9 |

From the results of this example it can be seen that the lower Base Number magnesium sulfonate, i.e., the Bryton M-10, provides a quite accelerated reaction rate yet doesn't contribute appreciably to the formation of heavys.

With reference to all twelve of the foregoing examples, it is seen that the alkaline earth metal sulfonates are effective to promote or catalyze the reaction involving thermolysis of styrene oxide to phenylacetaldehyde. Moreover, it is further seen that magnesium sulfate is usually more effective as a promoter than calcium sulfonate, under the conditions run.

The sulfonates utilized in the present invention can be employed merely to treat or passivate the vessel. An example of this utilization is as follows:

EXAMPLE 13

A 2 liter Parr flask is utilized in the thermolysis of styrene oxide to form phenylacetaldehyde, without alkaline metal sulfonates being utilized. After some 30 runs, the reaction becomes almost totally inhibited. The reactor is filled with benzene which has mixed with it 15 grams of calcium sulfonate (Bryton 45). The stirrer is activated and the reactor is left in contact with the benzene-calcium sulfonate for two days. The reactor is then emptied and allowed to drip dry, but not rinsed. Then it is charged with 700 grams of benzene and 70 grams of styrene oxide. It is sealed and stirred while heating to provide a reaction temperature of 275°C for 2 ½ hours. Gas liquid chromatographic analysis yields the following results, with quantities being stated on a weight percent basis of the total sample:

| Reaction Time (hours) | Styrene Oxide | Phenyl Acetaldehyde | "Heavys" | "Lights" | "Benzene" |
|---|---|---|---|---|---|
| 1.0 | 5.6 | 9.3 | 1.1 | 0.5 | 83.5 |
| 2.0 | 3.3 | 8.1 | 0.9 | 0.3 | 87.3 |
| 2.5 | 2.9 | 10.1 | 1.6 | 0.3 | 84.6 |

Compared to the results obtained with the inhibited reactor before the passivation treatment, the treatment proves to be most helpful. Thus, before treatment, samples withdrawn at 2 hours were giving analytical values of about 12% styrene oxide and 3% phenylacetaldehyde, while after, such 2 hour samples ran about 3% styrene oxide and 8% phenylacetaldehyde.

In the foregoing example, barium sulfonate and other alkaline earth metal sulfonates may be utilized for passivation in the same manner as the calcium sulfonate of the example.

When the technique of passivation is utilized, e.g., as illustrated in Example 13, it will be noted that the alkaline earth metal sulfonate adhering to the vessel walls remains in the system after styrene oxide is introduced for reaction. Accordingly, not only does the alkaline earth metal sulfonate serve as a passivating agent for the vessel walls, but enough usually remains in the system to provide a trace quantity of the alkaline earth metal sulfonate during the reaction of styrene oxide to phenylacetaldehyde. As used herein, "trace quantity" means a very small but measurable quantity, as measured by the known methods of analysis, and running on the order of as little as 0.0001 weight percent, based on the total sample.

It should be understood that various modifications will now be apparent to one skilled in the art upon reading this specification and it is intended to cover such modifications as are covered by the appended claims.

What is claimed is:

1. The process of thermolysis of styrene oxide comprising heating styrene oxide in the presence of a member selected from the group consisting of aryl and alkyl aryl sulfonates of an alkaline earth metal at a temperature of between about 125°C and 450°C to obtain a reaction product comprising phenylacetaldehyde.

2. The process of claim 1, wherein said temperature is between about 175°C and 350°C.

3. The process of claim 1, wherein said sulfonate is a magnesium sulfonate.

4. The process of claim 1 wherein said sulfonate is a calcium sulfonate.

5. The process of claim 2 wherein said sulfonate is a magnesium sulfonate.

6. The process of claim 2 wherein said sulfonate is a calcium sulfonate.

7. The process of claim 1 wherein said styrene oxide is present in solution with an inert solvent at the time it is first subjected to heating.

8. The process of claim 7 wherein the temperature is between about 175°C and 350°C.

9. The process of claim 7 wherein said sulfonate is magnesium sulfonate.

10. The process of claim 7 wherein said sulfonate is calcium sulfonate.

11. The process of claim 8 wherein said sulfonate is magnesium sulfonate.

12. The process of claim 8 wherein said sulfonate is calcium sulfonate.

13. The process of claim 1 wherein said sulfonate is a magnesium sulfonate having a Base Number of between about 2 and 300.

14. The process of claim 1 wherein said sulfonate is a calcium sulfonate having a Base Number of between about 2 and 300.

15. The process of claim 13 wherein said Base Number is between about 5 and 30.

16. The process of claim 14 in which said Base Number is between about 5 and 30.

17. In the process of making phenylacetaldehyde from styrene oxide in a reaction vessel wherein the said styrene oxide is introduced into said vessel and heated to cause a reaction whereby the thermolysis of styrene oxide occurs to form phenylacetaldehyde, the improvement comprising introducing into said vessel, the said styrene oxide, an effective quantity of a sulfonate as a promoter for the formation of phenylacetaldehyde from styrene oxide, the said sulfonate being selected from the group consisting of aryl and alkyl aryl sulfonates of an alkaline earth metal.

18. The process of claim 17 wherein said sulfonate promoter is introduced to passivate the reaction vessel prior to starting the reaction step in which styrene oxide is converted to phenylacetaldehyde.

19. The process of claim 17 wherein said sulfonate promoter is charged into said reactor in small proportion, wherein said reactor is charged with a minor amount of styrene oxide and a major amount of inert solvent, and wherein the reaction temperature is maintained betweenn about 175°C and 350°c.

* * * * *